United States Patent
Wong et al.

(10) Patent No.: US 9,612,994 B2
(45) Date of Patent: Apr. 4, 2017

(54) SNOOP AND REPLAY FOR COMPLETING BUS TRANSACTION

(71) Applicant: NVIDIA Corporation, Santa Clara, CA (US)

(72) Inventors: Kevin Wong, San Jose, CA (US); Craig Ross, Santa Clara, CA (US); Thomas Dewey, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 613 days.

(21) Appl. No.: 14/030,415

(22) Filed: Sep. 18, 2013

(65) Prior Publication Data

US 2015/0081937 A1   Mar. 19, 2015

(51) Int. Cl.
G06F 13/00 (2006.01)
G06F 1/00 (2006.01)
G06F 13/42 (2006.01)
G06F 1/32 (2006.01)
G06F 13/364 (2006.01)

(52) U.S. Cl.
CPC ........ *G06F 13/4291* (2013.01); *G06F 1/3203* (2013.01); *G06F 13/364* (2013.01); *G06F 2213/0016* (2013.01); *Y02B 60/1228* (2013.01); *Y02B 60/1235* (2013.01)

(58) Field of Classification Search
USPC ................ 710/104–110, 305–315, 260–269; 713/300–340
See application file for complete search history.

(56) References Cited

U.S. PATENT DOCUMENTS

| | | | |
|---|---|---|---|
| 6,553,441 B1 * | 4/2003 | Wang | G06F 13/385 709/250 |
| 7,256,788 B1 * | 8/2007 | Luu | G06F 1/3203 345/211 |
| 7,653,757 B1 * | 1/2010 | Fernald | G06F 1/26 323/222 |
| 7,991,939 B1 * | 8/2011 | Tsu | G06F 1/3203 710/311 |
| 8,250,396 B2 * | 8/2012 | Arimilli | G06F 9/485 711/204 |
| 8,386,822 B2 * | 2/2013 | Arimilli et al. | |

(Continued)

OTHER PUBLICATIONS

NXP Semiconductors, "UM10204 I2C-bus specification and user manual," Rev. 5 (Oct. 9, 2012): 1-64.

(Continued)

*Primary Examiner* — Raymond Phan
(74) *Attorney, Agent, or Firm* — Billion & Armitage; Richard Billion; Michael Collins

(57) ABSTRACT

Systems and devices configured to implement techniques for ensuring the completion of transactions while minimizing latency and power consumption are described. A device may be operably coupled to a bidirectional communications bus. A bidirectional communications bus may include a clock line and a data line. The device may be configured to determine if an initiated transaction corresponds to a device in a low power state. The device may pause the transaction. The device may replay portions of the transaction when the device is in an appropriate power state. The device may replay portions of the transaction using an override interface.

20 Claims, 10 Drawing Sheets

(56) References Cited

U.S. PATENT DOCUMENTS

| | | | | |
|---|---|---|---|---|
| 8,386,832 B2* | 2/2013 | Karam | ...................... | H04L 1/22 |
| | | | | 714/2 |
| 8,438,416 B2* | 5/2013 | Kocev | ................... | G06F 1/3237 |
| | | | | 713/322 |
| 8,473,764 B2* | 6/2013 | de Cesare | ............. | G06F 1/3203 |
| | | | | 713/320 |
| 8,645,585 B2* | 2/2014 | Wyatt et al. | ........... | G09G 5/006 |
| | | | | 710/10 |
| 8,732,496 B2* | 5/2014 | Wyatt | .................... | G09G 5/001 |
| | | | | 713/320 |
| 8,907,960 B2* | 12/2014 | He | ........................ | G06F 1/3265 |
| | | | | 345/522 |
| 9,208,755 B2* | 12/2015 | Sharma | .................. | G09G 5/363 |
| 2009/0199183 A1* | 8/2009 | Arimilli | .................... | G06F 9/52 |
| | | | | 718/100 |
| 2009/0204834 A1* | 8/2009 | Hendin | ..................... | G06F 1/22 |
| | | | | 713/323 |
| 2009/0259861 A1* | 10/2009 | Tune | ..................... | G06F 1/3203 |
| | | | | 713/320 |
| 2010/0115249 A1* | 5/2010 | Paltashev | ............ | G06F 9/30087 |
| | | | | 712/228 |
| 2011/0113171 A1* | 5/2011 | Radhakrishnan | ... | G06F 13/4291 |
| | | | | 710/110 |

OTHER PUBLICATIONS

Duracell, Inc. et al. "System Management Bus (SMBus) Specification," SBS Implementers Forum (Aug. 3, 2000) Version 2.0: 1-59.
NXP Semiconductors, " UM10204 I2C-bus specification and user manual," Rev. 5 (Oct. 9, 2012): 1-64.

* cited by examiner

SNOOP AND REPLAY FOR COMPLETING BUS TRANSACTION

TECHNICAL FIELD

This disclosure relates to systems and methods for bus communications and, more particularly, to techniques for completing bus transactions.

BACKGROUND

Devices including laptop or desktop computers, tablet computers, televisions, digital video recorders, set-top boxes, digital media players, video gaming devices, video game consoles, and cellular telephones may include one or more graphics processing units (GPUs). A GPU may include multiple cores. GPUs may utilize one or more wired communication protocols for communications. To conserve power, a GPU may cause one or more of the cores to enter a low power state.

The I²C-bus (Inter-IC) specification defines a two-wire bidirectional bus for efficient inter-IC (integrated circuit) control. The System Management Bus (SMBus) specification is based on I²C and defines another protocol for the two-wire bidirectional bus interface. For both the I²C-bus and SMBus, a serial data line and a serial clock line are used to transfer data from one device connected to the bus to another device connected to the bus. In both I²C-bus and SMBus a device that initiates a data transfer is referred to as a master device and a device that is addressed by a master is referred to as a slave device. A data transfer may be dropped if a slave device is in a low power state when a master initiates a data transfer.

SUMMARY

In general, this disclosure describes techniques for completing bus transactions. In particular, this disclosure describes techniques for ensuring the completion of transactions while minimizing latency and power consumption. In some examples, the techniques described herein may be implemented by a graphics processing unit (GPU). A GPU may be included in a graphics processing device, such as, for example, a personal computing device.

According to one example of the disclosure, a method for completing a bus transaction comprises receiving an address corresponding to one of a plurality of devices connected to a communications bus, determining whether the address corresponds to a device that is in a power state that does not enable completion of a transaction, and upon determining the address corresponds to a device that is in a power state that does not enable completion of a transaction, pausing a transaction associated with the received address, causing the device to enter a power state that enables completion of the transaction, transmitting the address to the device, and releasing the transaction.

According to another example of the disclosure an apparatus for completing a bus transaction comprises means for receiving an address corresponding to one of a plurality of devices connected to a communications bus, means for determining whether the address corresponds to a device that is in a power state that does not enable completion of a transaction, and means for upon determining the address corresponds to a device that is in a power state that does not enable completion of a transaction, pausing a transaction associated with the received address, causing the device to enter a power state that enables completion of the transaction, transmitting the address to the device, and releasing the transaction.

According to another example of the disclosure a device for completing a bus transaction, comprises one or more processors configured to: receive an address corresponding to one of a plurality of devices connected to a communications bus, determine whether the address corresponds to a device that is in a power state that does not enable completion of a transaction, and upon determining the address corresponds to a device that is in a power state that does not enable completion of a transaction, pause a transaction associated with the received address, cause the device to enter a power state that enables completion of the transaction, transmit the address to the device, and release the transaction.

According to another example of the disclosure a non-transitory computer-readable storage medium has instructions stored thereon that upon execution cause one or more processors of a device to receive an address corresponding to one of a plurality of devices connected to a communications bus, determine whether the address corresponds to a device that is in a power state that does not enable completion of a transaction, and upon determining the address corresponds to a device that is in a power state that does not enable completion of a transaction, pause a transaction associated with the received address, cause the device to enter a power state that enables completion of the transaction, transmit the address to the device, and release the transaction.

According to another example of the disclosure a bidirectional communication system, comprises a first device operably coupled to a communications bus and configured to operate as a slave device, and a second device operably coupled to the communications bus configured to receive an address corresponding to the first device, determine that the first device is in a power state that does not enable completion of a transaction, pause a transaction associated with the received address, transmit the received address to the first device, and release the transaction.

According to another example of the disclosure a device operably coupled to a bidirectional communications bus including a clock line and a data line comprises one or more processors configured to determine a power state of a device operable coupled to the bidirectional communications bus and determine whether to replay one or more portions of a bus transaction based on the determined power state, and an override interface configured to provide clock and data communications to the one or more processors independent of the clock line and data line.

According to another example of the disclosure a method for managing a power down request comprises receiving a power down request, allowing a power down process to be initiated for a device, monitoring transactions on a communications bus, and aborting a power down process if there is a pending transaction for the device.

According to another example of the disclosure an apparatus for managing a power down request comprises means for receiving a power down request for a device, means for allowing a power down process to be initiated for the device, means for monitoring transactions on a communications bus, and means for aborting a power down process if there is a pending transaction for the device.

According to another example of the disclosure a device for managing a power down request comprises one or more processors configured to receive a power down request, allow a power down process to be initiated for a device, monitor transactions on a communications bus, and abort a power down process if there is a pending transaction for the device.

According to another example of the disclosure a non-transitory computer-readable storage medium has instructions stored thereon that upon execution cause one or more processors of a device to receive a power down request, allow a power down process to be initiated for a device, monitor transactions on a communications bus, and abort a power down process if there is a pending transaction for the device.

The details of one or more examples are set forth in the accompanying drawings and the description below. Other features, objects, and advantages will be apparent from the description and drawings, and from the claims.

DETAILED DESCRIPTION

This disclosure describes techniques for ensuring a slave device completes a transaction regardless of the power state of the slave device at the time the transaction is initiated by a master device. A device configured to communicate according to a bus communications protocol, such as, for example SMBus and/or I²C-bus may be configured to have multiple power states. For example, a device may have various sleep modes. That is, individual components of a device may be independently powered on and off. For example, an entire device and/or device components responsive to a clock and/or a data signal may be powered on/off. A slave device being in a particular power mode at the time a transaction is initiated by a master device may cause a transaction to be dropped.

In some cases, a slave device may implement a wake-up (e.g., power up components and/or power up device) in response to bus activity. Bus activity that may initiate a wake up may include, for example, a clock toggle or a START condition defined by SMBus and/or I²C-bus. However, even if a slave device is powered up in response to activity, a transaction may still be dropped if a master device does not receive an acknowledge in a timely manner and/or the master device does not support retry of the dropped transaction. In some cases, typical wake up and retry techniques may increase the latency for accessing the slave device. Further, typical wake up and retry techniques may cause false wakeups if the transaction is not targeted to the slave device. This results in wasted power. Dropped transactions may also occur if a power management system places a device in a low power state when a device is completing a transaction. In some cases, a power management system may determine power states of bus devices based on system resources and may not be aware of communications occurring on the bidirectional bus. This disclosure provides techniques for ensuring the completion of transactions while minimizing latency and power consumption.

Figure 1:
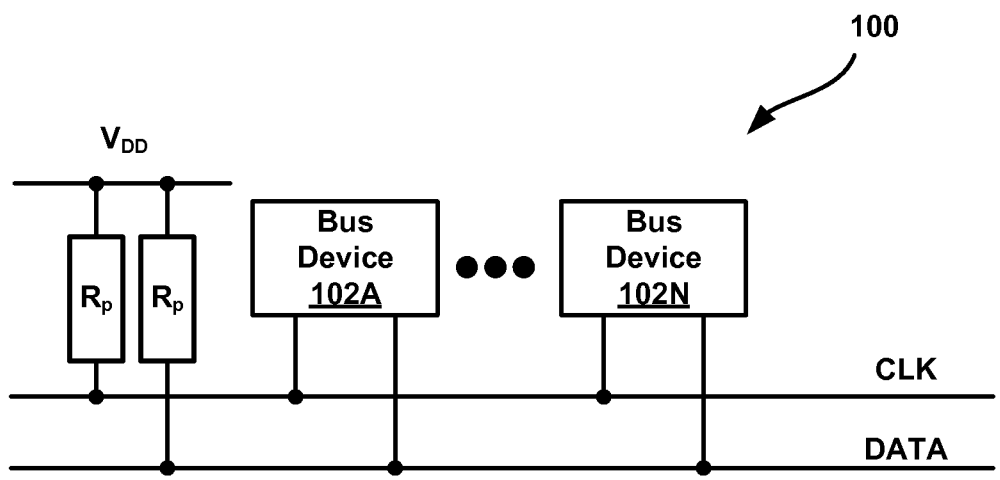
FIG. 1 is a block diagram illustrating an example of a bidirectional bus system in accordance with one or more techniques of this disclosure.

FIG. 1 is a block diagram illustrating an example of a bidirectional bus system in accordance with one or more techniques of this disclosure. As illustrated in FIG. 1, bidirectional bus system 100 includes a plurality of bus devices 102A-102N operably coupled to a clock line (CLK) and a data line (DATA). Further, a voltage source, $V_{DD}$, may be coupled to clock line and data line using pull-up resistors $R_P$. The values of $V_{DD}$ and $R_P$ may be determined according to a bus standard, such as, for example, I²C-bus or SMBus. I²C-bus is described in UM10204, I²C-bus Specification and User Manual Rev. 5, 9 Oct. 2012 and SMBus is described in System Management Bus Specification, Revision 2.0, SBS-Implementers Forum, August, 2000, each of which are incorporated by reference herein in their respective entirety.

Each of bus devices 102A-102N may be described as a master device or a slave device during a transaction depending on how a transaction is initiated. For example, if bus device 102A initiates sending data to or receiving data from device 102N, bus device 102A would be referred to as a master device and bus device 102N would be referred to as a slave device for both of these transactions. Bus devices 102A-102N may include devices having integrated or discrete logical circuitry including, for example, digital signal processors (DSPs), general purpose microprocessors, application specific integrated circuits (ASICs), field programmable logic arrays (FPGAs), flash memory devices, graphics processing units (GPUs), and GPU cores. In one example, bus devices 102A-102N may include GPUs described below with respect to FIG. 3.

Figure 2:
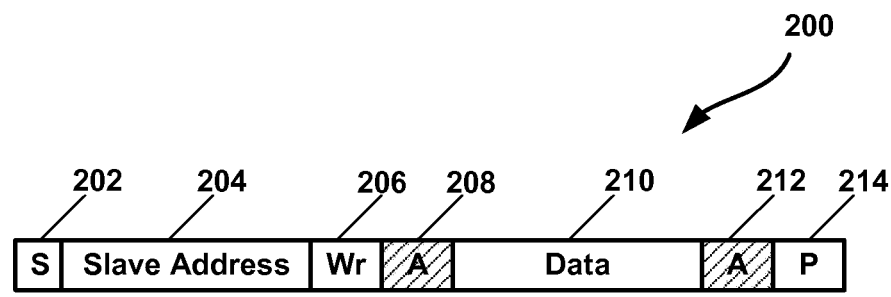
FIG. 2 is a conceptual diagram illustrating an example of a transaction on a bidirectional bus in accordance with one or more techniques of this disclosure.

FIG. 2 is a conceptual diagram illustrating an example of a transaction on a bidirectional bus in accordance with the techniques of this disclosure. Transaction 200 may be completed using bidirectional bus system 100. As illustrated in FIG. 2, transaction 200 includes a plurality of data communications, where communications illustrated with cross-hatching (i.e., 208 and 212) are from a slave device to a master device and communications illustrated without cross-hatching (i.e., 202, 204, 206, 210, 214) are from a master device to a slave device.

Transaction 200 is initiated when a master device presents a START condition, (S) 202 on the bus. In one example, a START condition may be a high-to-low data transition while the clock is high. Subsequent to presenting a START condition, a master device presents a byte including a seven bit slave address 204 and a direction bit 206 on the bus. In the example illustrated in FIG. 2, direction bit 206 indicates the type of transaction is a write transaction (Wr). In other examples, direction bit 206 may indicate the type of transaction is a read transaction. In one example, a direction bit logical value of zero may indicate a request to transmit (WRITE) data to a slave device and a direction bit logical value of one may indicate a request to receive (READ) data from a slave device. In the example illustrated in FIG. 2, a slave device acknowledges the request of the master device by presenting an acknowledgement (A) 208. After receiving an acknowledgment, the master device presents data 210. In some examples, data 210 may be organized into bytes. In the example of a read transaction, the slave device would present the data. In the example illustrated in FIG. 2, the slave device acknowledges receiving the data by presenting acknowledgement (A) 212. Transaction 200 is terminated by a STOP condition (P) 214 generated by the master device. In one example, a STOP condition may be a low-to-high data transition while the clock is high. It should be noted that in some cases if a master device still wishes to communicate on the bus, the master device can generate a repeated START condition (Sr) and address another slave device without first generating a STOP condition. Thus, various combinations of read/write formats are possible.

It should be noted that the completion of transaction 200 is subject to clock synchronization of a master device and a slave device. A master device and a slave device are synchronized based a clock signal presented on clock line. Clock synchronization allows devices of different speeds to co-exist on a bus. Each of I²C-bus and SMBus allow slave devices to cope with faster master devices by clock stretching. That is, for example, a slave device may delay acknowledgement and subsequent data transmissions by holding the clock line to a low value after a data byte is presented. Clock stretching may be used to provide a slave device more time to process received data or to prepare for data transmission.

Figure 3:
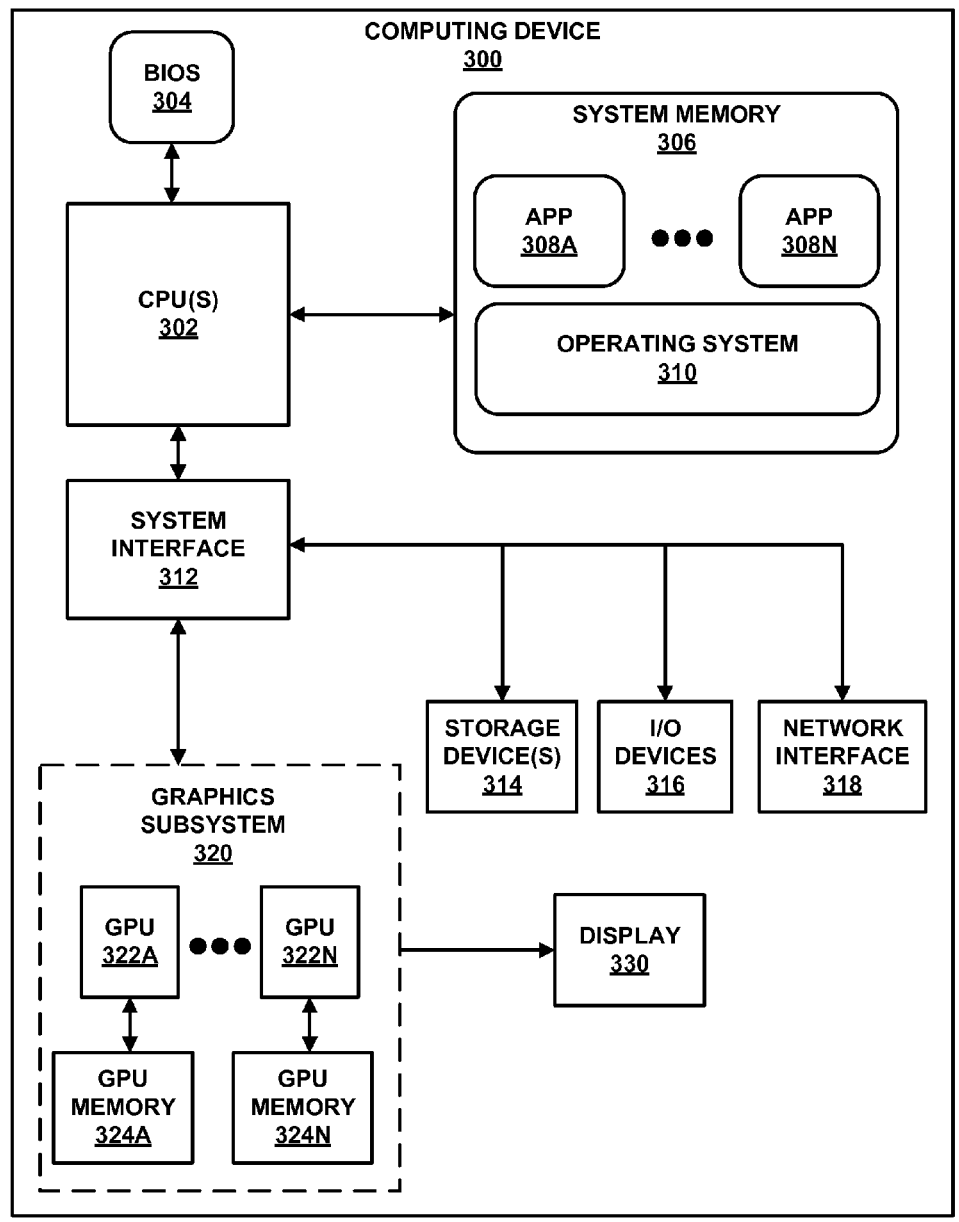
FIG. 3 is a block diagram illustrating an example of a computing device that may implement one or more techniques of this disclosure.

FIG. 3 is a block diagram illustrating an example of a computing device that may implement one or more techniques of this disclosure. Computing device 300 is an example of a computing device configured to execute one or more applications. Computing device 300 may include or be part of any device configured to execute one or more applications. For example, computing device 300 may include devices, such as, for example, desktop or laptop computers, mobile devices, smartphones, cellular telephones, personal data assistants (PDA), tablet devices, set top boxes, and personal gaming devices. Computing device 300 may be equipped for wired and/or wireless communications. In one example, computing devices 300 may be configured to send and receive data from a communications network.

Computing device 300 includes central processor unit(s) 302, BIOS 304, system memory 306, system interface 312, storage device(s) 314, I/O devices 316, network interface 318, graphics subsystem 320, and display 330. As illustrated in FIG. 3, system memory 306 includes applications 308A-308N and operating system 310. Further, as illustrated in FIG. 3, graphics subsystem 320 includes GPU(s) 322A-322N, and GPU memory 324A-324N. It should be noted that although example computing device 300 is illustrated as having distinct functional blocks, such an illustration is for descriptive purposes and does not limit computing device 300 to a particular hardware or software architecture. Functions of computing device 300 may be realized using any combination of hardware, firmware and/or software implementations.

CPU(s) 302 may be configured to implement functionality and/or process instructions for execution in computing device 300. CPU(s) 302 may be capable of retrieving and processing instructions, code, and/or data structures for implementing one or more of the techniques described herein. Instructions may be stored on a computer readable medium, such as system memory 306 or storage devices 314. CPU(s) 302 may include digital signal processors (DSPs), general purpose microprocessors, application specific integrated circuits (ASICs), field programmable logic arrays (FPGAs), or other equivalent integrated or discrete logic circuitry. CPU(s) 302 may include multi-core central processing units. CPU(s) 302 may be configured such that dedicated graphic processing units, such as those included in graphics subsystem 320, are used for graphics processing.

BIOS (Basic Input/Output System) 304 may include a storage medium having low-level system software stored thereon. For example, BIOS 304 may include a program stored in read only memory ("ROM") or flash memory that is run whenever computing device 300 boots up and enables basic input and output functionality. Further, BIOS 304 may be configured to initialize and boot an operating system, such as, for example, operating system 310.

System memory 306 may be configured to store information that may be used by computing device 300 during operation. System memory 306 may be used to store program instructions for execution by CPU(s) 302 and may be used by software or applications running on computing device 300 to temporarily store information during program execution. For example, system memory 306 may store instructions associated with operating system 310 and applications 308A-308N. Applications 308A-308N may be any applications implemented within or executed by computing device 300 and may be implemented or contained within, operable by, executed by, and/or be operatively/communicatively coupled to components of computing device 300. Applications 308A-308N may include instructions that may cause CPU(s) 302 of computing device 300 to perform particular functions. Applications 308A-308N may include algorithms which are expressed in computer programming statements, such as, for-loops, while-loops, if-statements, do-loops, etc.

As further illustrated in FIG. 3, applications 308A-308N may execute "on top of" operating system 310. That is, operating system 310 may be configured to facilitate the interaction of applications 308A-308N with CPUs(s) 302, and other hardware components of computing device 300, such as, for example, graphics subsystem 320. Operating system 310 may be an operating system designed to be installed on laptops, desktops, smartphones, tablets, set-top boxes, and/or gaming devices. For example, operating system 310 may be a Windows®, Linux, or Mac OS, Android, iOS, Windows Mobile®, or a Windows Phone® operating system.

System memory 306 may be described as a non-transitory or tangible computer-readable storage medium. In some examples, system memory 306 may provide temporary memory and/or long-term storage. In some examples, system memory 306 or portions thereof may be described as non-volatile memory and in other examples portions of system memory 306 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System interface 312 may be configured to enable communication between components of computing device 300.

In one example, system interface 312 comprises structures that enable data to be transferred from one peer device to another peer device or to a storage medium. For example, system interface 312 may include a chipset supporting Accelerated Graphics Port ("AGP") based protocols, Peripheral Component Interconnect (PCI) bus based protocols, such as, for example, the PCI Express™ ("PCIe") bus specification, which is maintained by the Peripheral Component Interconnect Special Interest Group, or any other form of structure that may be used to interconnect peer devices.

Storage device(s) 314 represents memory of computing device 300 that may be configured to store relatively larger amounts of information for relatively longer periods of time than system memory 306. Similar to system memory 306, storage device(s) 314 may also include one or more non-transitory or tangible computer-readable storage media. Storage device(s) 314 may be internal or external memory devices and in some examples may include non-volatile storage elements. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

I/O device(s) 316 may be configured to receive input and provide output during operation of computing device 300. Input may be generated from an input device, such as, for example, touch-sensitive screen, track pad, track point, mouse, a keyboard, a microphone, video camera, or any other type of device configured to receive input. Output may be provided to output devices, such as, for example speakers or a display device. In some examples, I/O device(s) 316 may be used for basic input and output functions associated with BIOS 304. In some examples, I/O device(s) 316 may be external to computing device 300 and may be operatively coupled to computing device 300 using a standardized communication protocol, such as for example, Universal Serial Bus protocol (USB).

Network interface 318 may be configured to enable computing device 300 to communicate with external computing devices via one or more networks. Network interface 318 may be a network interface card, such as an Ethernet card, an optical transceiver, a radio frequency transceiver, or any other type of device that can send and receive information. Network interface 318 may be configured to operate according to one or more of the communication protocols associated with a packet-based network, such as a local area network, a wide-area network, or a global network such as the Internet. Examples of communication protocols include Global System Mobile Communications (GSM) standards, code division multiple access (CDMA) standards, 3rd Generation Partnership Project (3GPP) standards, Internet Protocol (IP) standards, Wireless Application Protocol (WAP) standards, and/or an IEEE standards, such as, one or more of the 802.11 standards, as well as various combinations thereof.

Display 330 may be configured to provide visual output generated during the operation of computing device 300. For example, display 330 may include a cathode ray tube (CRT) monitor, a liquid crystal display (LCD), or any other type of device that can provide output. In some examples, display 330 may be an integrated display. In the example where computing device 300 is a mobile device, display 330 may be an integrated touch-screen display. For example, display 330 may be an organic light emitting diode (OLED) display configured to receive user touch inputs, such as, for example, taps, drags, and pinches. In other examples, display 330 may be an external display device coupled to computing device 300 using a standardized communication protocol, such as, for example, High-Definition Multimedia Interface (HDMI), Digital Visual Interface (DVI), DisplayPort, and Video Graphic Array (VGA).

Graphics subsystem 320 may be configured to receive commands and data and output pixel data. Graphics subsystem 320 may be configured to output pixel data to display 330 according a standardized communication protocol (e.g., HDMI, DVI, DisplayPort, and/or VGA). As illustrated in FIG. 3, graphics subsystem 320 may include a plurality of graphics processing units 322A-322N. GPUs 322A-322N may include multiple processing cores. GPUs 322A-322N may perform graphics processing associated with the execution of applications 308A-308N. GPUs 322A-322N may be configured to operate according to an application programming interface, such as, for example, OpenGL and/or Direct3D. GPUs 322A-322N may operate according to a graphics pipeline process (e.g., input assembler, vertex shader, geometry shader, rasterizer, pixel shader, and output merger). Each of GPUs 322A-322N may have primary display and 3D rendering capabilities. GPU memories 324A-324N may include storage mediums configured to store data generated during a graphics pipeline process. For example, GPU memories 324A-324N may include frame buffers. Further, GPU memories 324A-324N may store instructions that are executed by GPUs 322A-322N.

Figure 4:
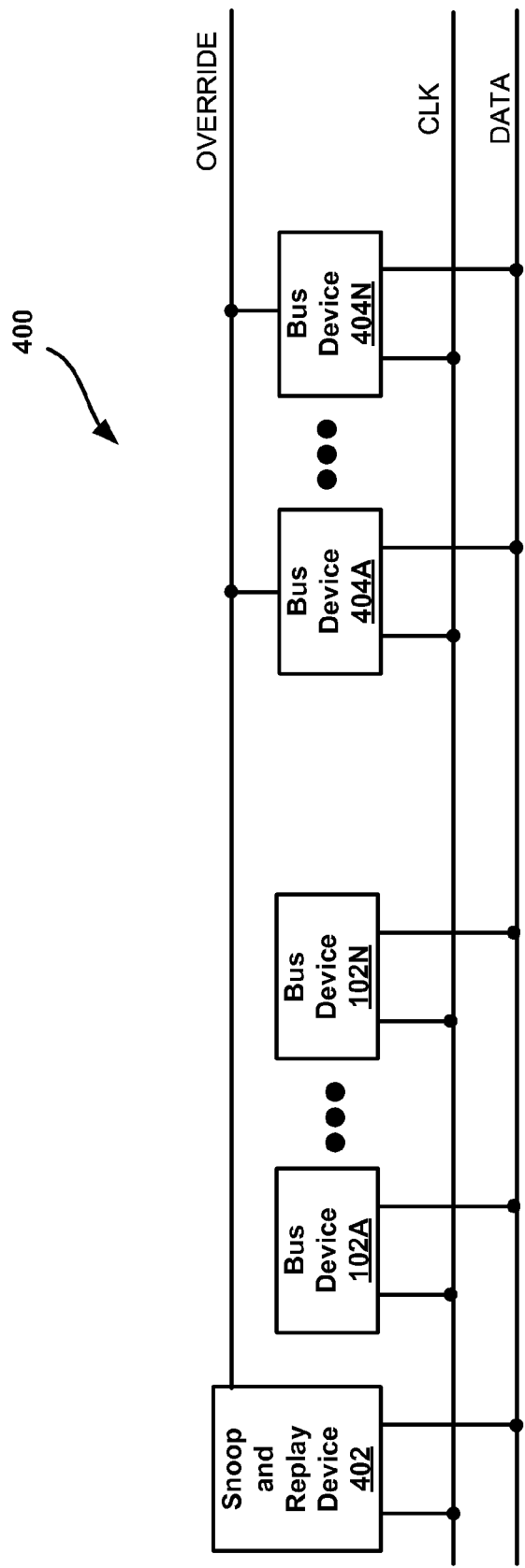
FIG. 4 is a block diagram illustrating an example of a bidirectional bus system that may implement one or more techniques of this disclosure.

As described above, processing cores of GPUs may be configured to communicate according to a bidirectional bus protocol, such as, for example, SMBus and/or I$^2$C-bus. GPUs 322A-322N and/or components thereof, including processing cores, may be configured to operate according to a bidirectional communications bus. Further, GPUs 322A-322N and/or components thereof may be configured to complete bus transactions according to the techniques described herein. FIG. 4 is a block diagram illustrating an example of a bidirectional bus system in accordance with one or more techniques of this disclosure.

As illustrated in FIG. 4, system 400 includes snoop and replay device 402, a plurality of bus devices 102A-102N and 404A-404N operably coupled to clock line (CLK) and data line (DATA). The transfer of data using clock line (CLK) and data line (DATA) in system 400 may be similar to the transfer of data described above with respect to system 100. For the sake of brevity, details of data transfer using CLK and DATA as provided above with respect to system 100 are not repeated. Bus devices 102A-102N and 404A-404N may include GPUs and/or components thereof. As illustrated in FIG. 4, in addition to being operatively coupled to CLK and DATA each of snoop and replay device 402 and bus devices 404A-404N are operably coupled to override line (OVERRIDE). Thus, each of snoop and replay device 402 and bus devices 404A-404N may be configured to communicate using CLK, DATA, and OVERRIDE. It should be noted that although it is not explicitly illustrated in FIG. 4, each of snoop and replay device 402 and bus devices 404A-404N may have outgoing CLK signals which are effectively logically AND'ed. As described in detail below, snoop and replay device 402 may pause a transaction using an outgoing CLK signal.

Figure 5:
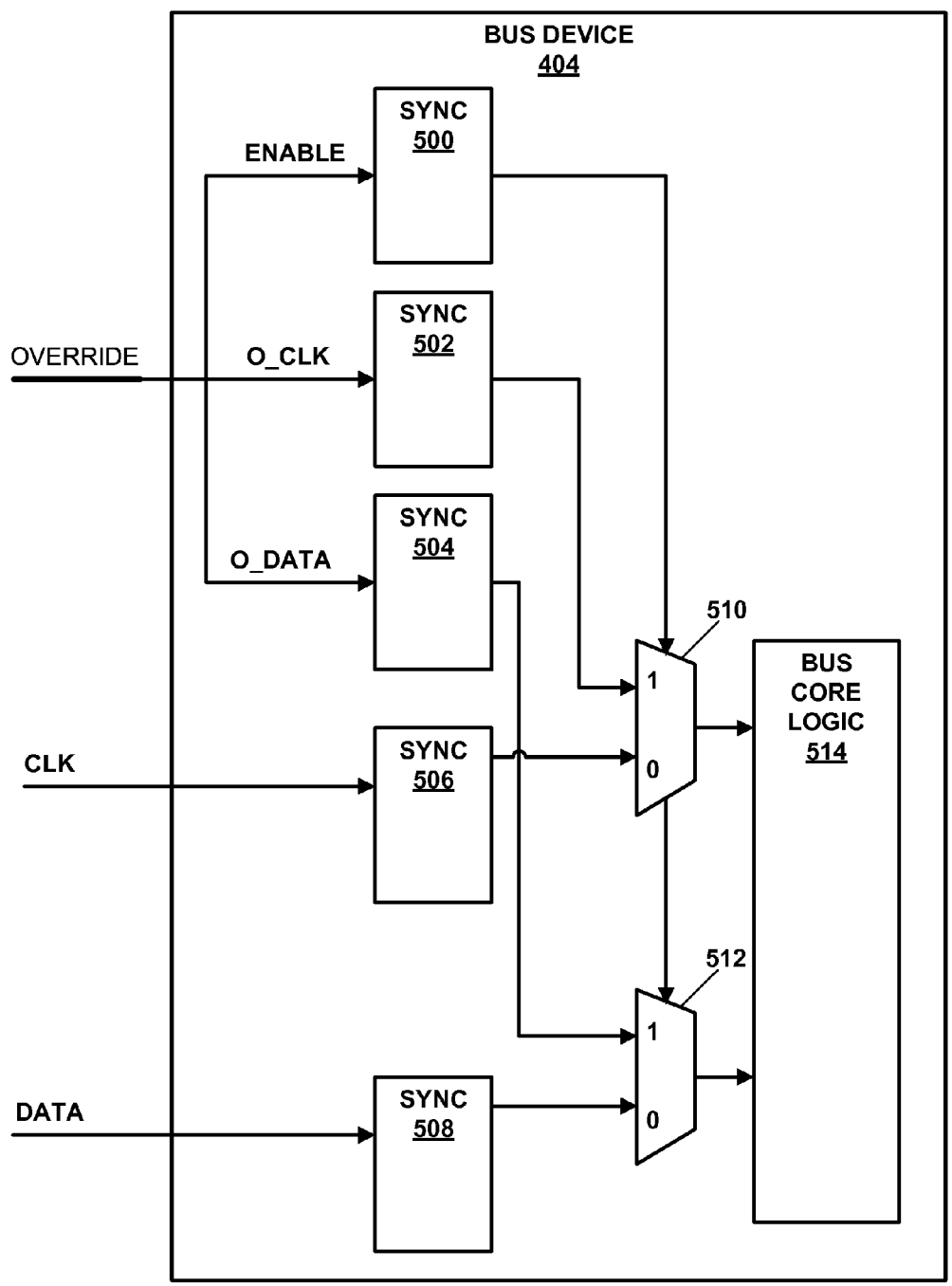
FIG. 5 is a block diagram illustrating an example of a bus device that may implement one or more techniques of this disclosure.

FIG. 5 is a block diagram illustrating an example of a bus device that may implement one or more techniques of this disclosure. FIG. 5 illustrates an example of a bus device 404 configured to communicate using CLK, DATA, and OVERRIDE lines. In one example, bus device 404 may be included as part of a GPU and/or a GPU component, such as, for example, a GPU processing core. In the example, where bus device 404 is a GPU processing device, bus device 404 may be configured to power down when its processing resources are not in use. In one example, CLK and DATA may be coupled to GPU pads. Bus device 404 includes synchronizer 500, synchronizer 502, synchronizer 504, synchronizer 506, synchronizer 508, multiplexer 510, multiplexer 512, and bus core logic 514. Each of synchronizer 500, synchronizer 502, synchronizer 504, synchronizer 506, and synchronizer 508 may be configured to remove metastability from a received signal. In one example, each of synchronizer 500, synchronizer 502, synchronizer 504, synchronizer 506, and synchronizer 508 may be a two-stage synchronizer including two flip-flop circuits.

As illustrated in FIG. 5, bus device 404 receives a CLK signal, a DATA signal, and an OVERRIDE signal, where CLK and DATA signals are defined according to a bidirectional communication bus protocol. OVERRIDE signal includes an enable signal (ENABLE), an override clock signal (O_CLK), and an override data signal (O_DATA). As described in detail below, OVERRIDE signal may be controlled by snoop and replay device 402 and may be used to repeat portions of a bus transaction. Snoop and replay device 402 may use OVERRIDE to independently repeat any portion of a bus transaction. For example, snoop and replay device 402 may use OVERRIDE to independently repeat a START condition, a slave address, a direction bit, and/or a STOP condition. Snoop and replay device 402 may use pause and replay transactions based on the power state of a slave device.

After a respective synchronizer removes metastability from a received signal, the signal is received at one of multiplexer 510 or multiplexer 512. As illustrated in FIG. 5, a synchronized ENABLE signal is daisy chained from multiplexer 510 to multiplexer 512 and controls the output of multiplexer 510 and multiplexer 512 provided to bus core logic 514. Bus core logic 514 may be configured to receive and process bidirectional bus communication transactions according to a bus protocol. For example, bus core logic 514 may be configured to process transaction according to I²C-bus and/or SMBus.

As illustrated in FIG. 5, multiplexer 510 receives synchronized CLK and O_CLK signals as inputs and outputs one of CLK or O_CLK based on the value of ENABLE. In a similar manner, multiplexer 512 receives synchronized DATA and O_DATA as inputs and outputs one of DATA or O_DATA based on the value of ENABLE. Thus, values of each of CLK and DATA may be overridden by O_CLK and O_DATA based on the value of ENABLE.

Figure 6:
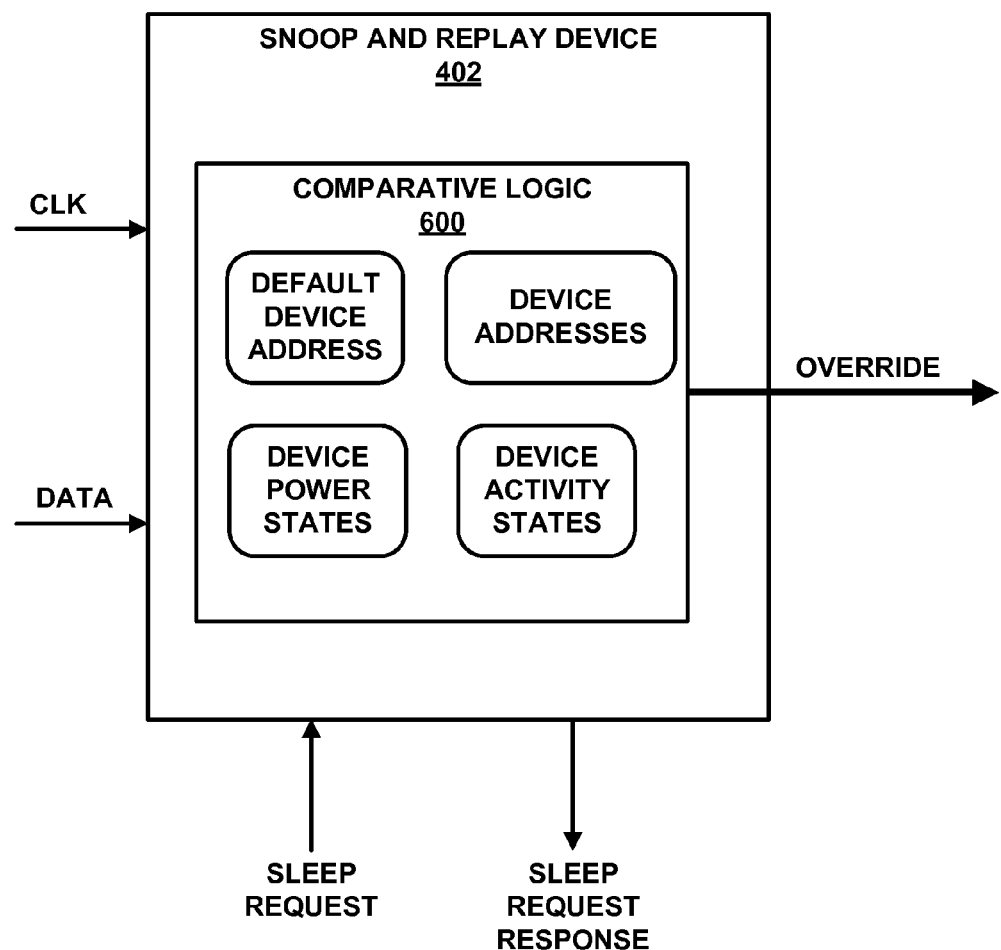
FIG. 6 is a block diagram illustrating an example of a bus device that may implement one or more techniques of this disclosure.

FIG. 6 is a block diagram illustrating an example of a bus device that may implement one or more techniques of this disclosure. FIG. 6 illustrates an example of a snoop and replay device 402 that may provide OVERRIDE signal to bus device 404. That is, snoop and replay device 402, may be configured to set the value of ENABLE such that CLK and DATA are overridden by O_CLK and O_DATA. Snoop and replay device 402 may be configured to prevent dropped transactions on a communications bus. As illustrated in FIG. 6, snoop and replay device 402 includes comparative logic 600. Comparative logic 600 may be configured to store information associated with one or more devices connected to a bus (e.g., devices 404A-404N) and compare the stored information with data transmitted on a bus. For example, comparative logic 600 may compare a stored device address to an address byte of a transaction and determine if a master device wishes to send data to or receive data from a device.

Snoop and replay device 402 may be configured to monitor all transactions occurring on a communications bus. In one example, snoop and replay device 402 is an always-on power island. In one example, comparative logic 600 may be implemented using minimal logic (e.g., AND/OR circuits) thereby minimizing power requirements and space required to implement snoop and replay device 402. However, it should be noted that functions of snoop and replay device 402 may be realized using any combination of hardware, firmware and/or software implementations.

In the example illustrated in FIG. 6, comparative logic 600 stores a default device address, device addresses, device power states, and device activity states. A stored default device address may be defined according to a bus standard and may be used by a master device to issue a general command to devices connected to a bus. For example, SMBus allows for the use of a default address for Address Resolution Protocol (ARP) commands. Stored device addresses may be the respective address of one or more devices, e.g., devices 402A-402N, operably coupled to a clock line and a data line of a bus. Stored device power states may be power states (e.g., ON/OFF) corresponding to one or more of a plurality of devices connected to a bus. In one example, device power states may be stored using a state machine corresponding to each of the devices. Stored device activity states may indicate whether a device is currently executing a transaction. A device activity state may be stored using a state machine that stores the last device address received on a bus. For example, comparative logic 600 may receive a device address, as described above with respect to FIG. 2, and determine that a device corresponding to the device address is executing a transaction if a STOP condition has yet to occur.

Figure 7:
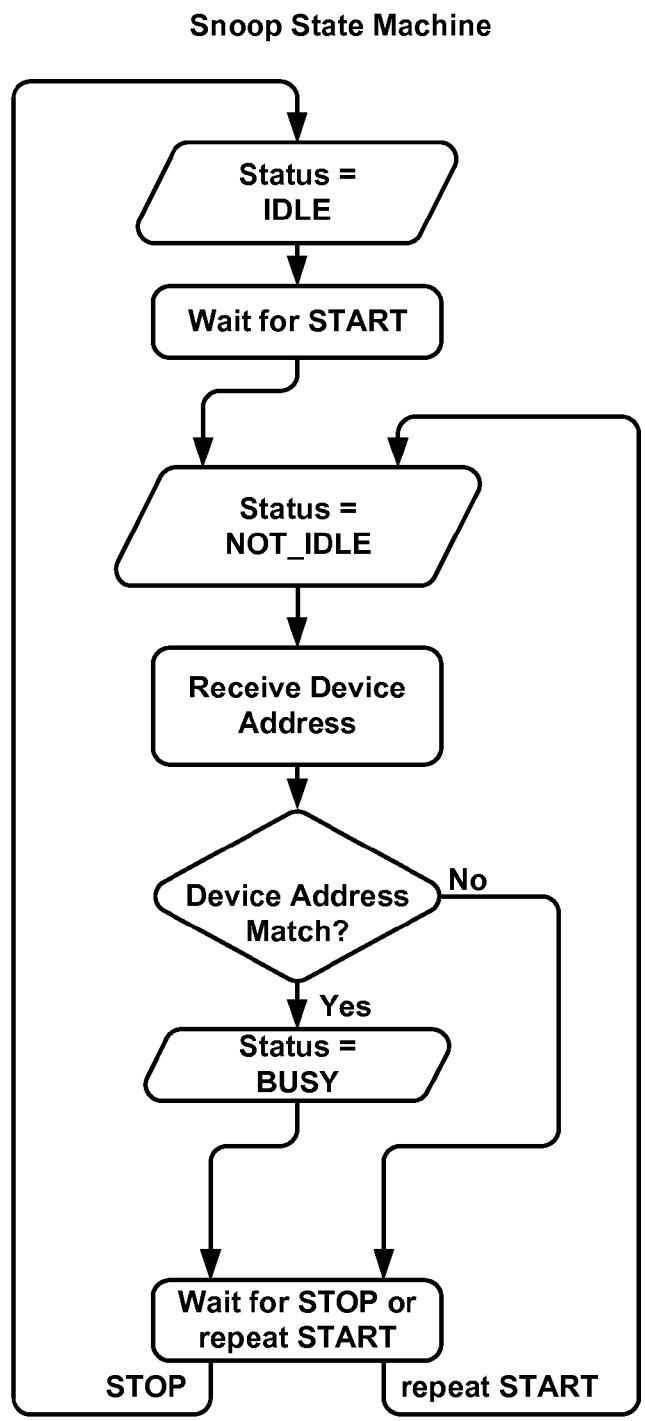
FIG. 7 is a flowchart illustrating an example operation of a snoop state machine according to the techniques of this disclosure.

In one example, snoop and replay device 402 may include a snoop state machine and a replay state machine. A snoop state machine may be configured to output status states to a replay state machine. FIG. 7 is a flowchart illustrating an example operation of a snoop state machine according to techniques of this disclosure. In the example illustrated in FIG. 7, snoop state machine includes three status states, IDLE, NOT_IDLE, and BUSY. An IDLE state may correspond to a state where no transactions for any devices on the bus are pending. For example, an IDLE state may indicate that a STOP condition has been received and no START conditions have been received. A NOT_IDLE state may correspond to a state where a transaction for a device other than a particular device is pending on the bus. For example, a START condition may have been received, but an address may not match the address of a particular device. A BUSY state may correspond to a state where a transaction for a particular device is pending on the bus. For example, a START condition may have been received and an address may match the address of a particular device. Snoop state machine may remain in a NOT_IDLE or BUSY state until a STOP condition or a repeated START condition occurs.

As described above, a power management system, such as, for example, power management software may determine power states of a bus device based on system resources and may not be aware of communications occurring on the bidirectional bus. For example, if a bus device is one of a plurality of graphics processing cores in a GPU, a power management system may determine a power state for the bus device based on the amount of graphics processing resources that are expected to be utilized during a time period. Referring again to FIG. 6, snoop and replay device 402 is configured to receive a sleep request and output a sleep request response. That is, snoop and replay device 402 may be configured to keep track of whether slave device is actively handling a bus transaction when a power management system wishes to power down the slave device or is in the process of powering down the slave device.

Snoop and replay device 402 may handle power up and power down processed based on one of IDLE, NOT_IDLE, and BUSY described above with respect to FIG. 7. For example, snoop and replay device 402 may be configured to allow a sleep request to proceed for a bus device if a current bus transaction is not targeted to the bus device, but may cause a sleep request to be aborted, if the bus device is currently in the middle of a transaction. As described above, snoop and replay device 402 may use OVERRIDE to independently replay a STOP condition. The replay of the STOP condition may ensure that a slave device never sees two bus transactions merged into one transaction, regardless of when the slave device sleeps and wakes with respect to any transaction in progress. In one example, snoop and replay device 402 may determine whether to replay a STOP condition based on a status state when a device entered a low power state.

Figure 8A:
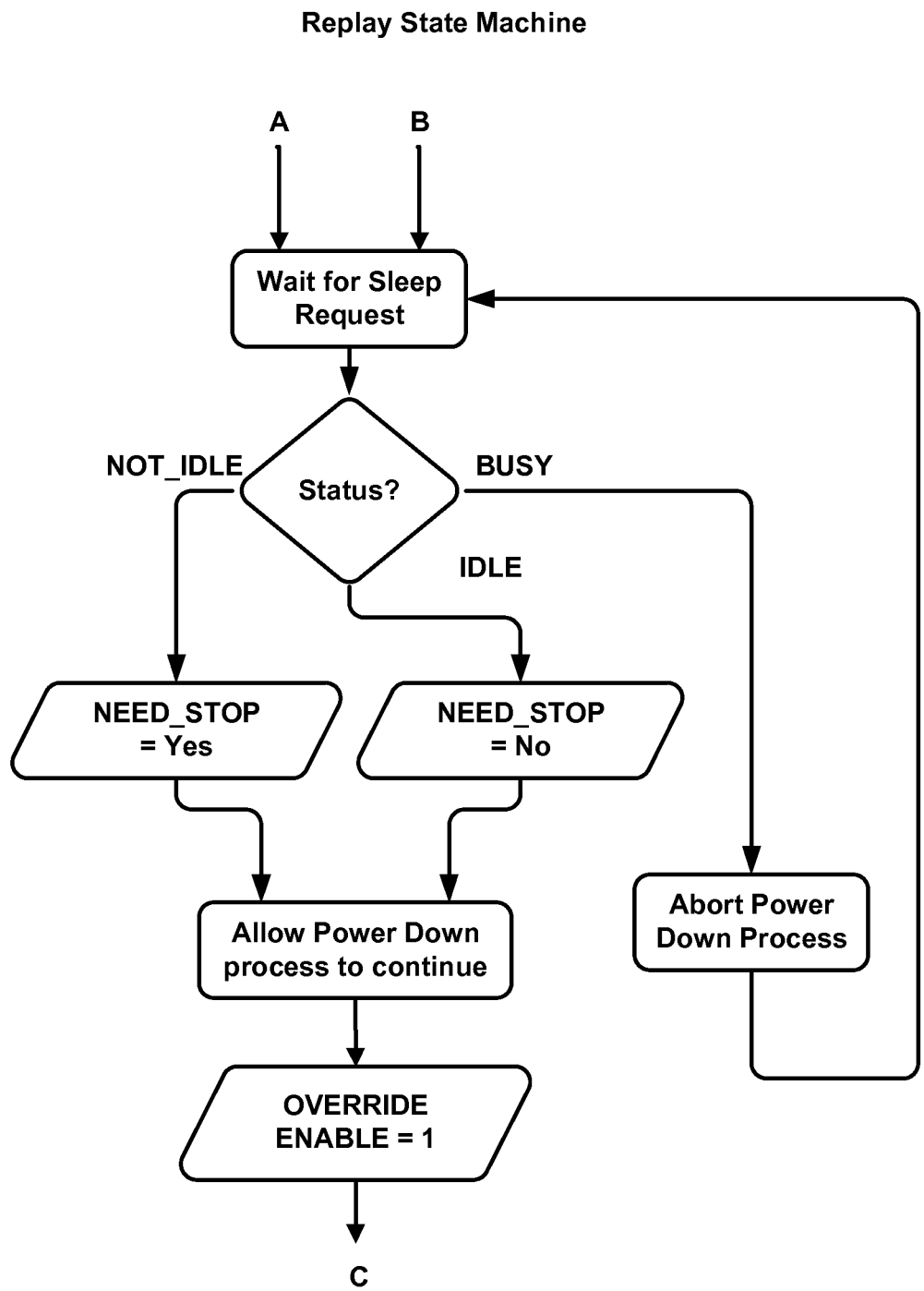
FIGS. 8A-8B are a flowchart illustrating an example operation of a replay state machine according to the techniques of this disclosure.
Figure 8B:
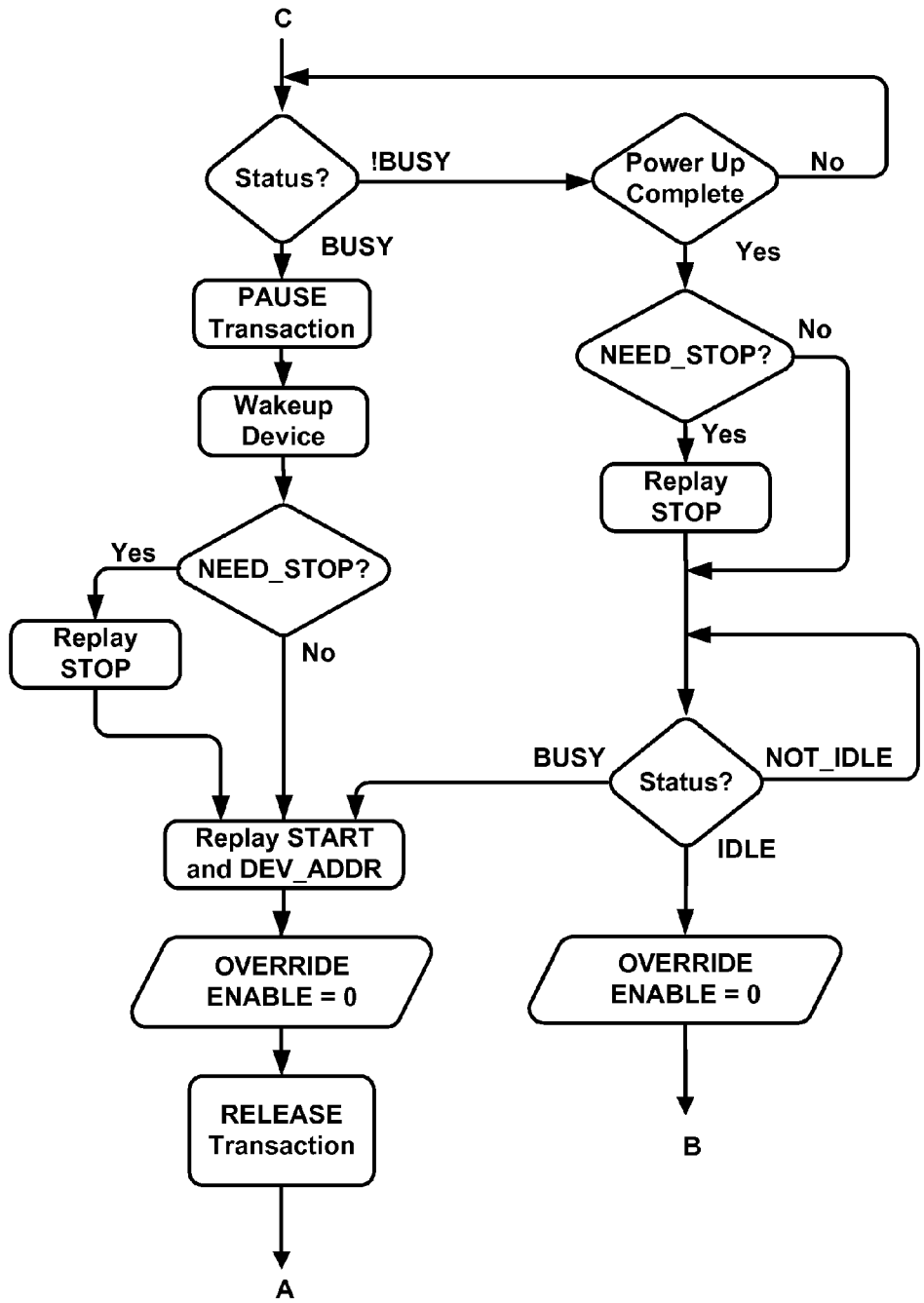

FIGS. 8A-8B are a flowchart illustrating an example operation of a replay state machine according to the techniques of this disclosure. As illustrated in FIG. 8A-8B replay state machine may query the status state provided by snoop state machine. That is, replay state machine may determine whether the status state is IDLE, NOT_IDLE, or BUSY and perform a power up or power down process based on the status state. FIG. 8A generally illustrates the operation of a replay state machine during a power down process. FIG. 8B generally illustrates the operation of a replay state machine during a power up process.

As illustrated in FIG. 8A, a replay state machine may monitor sleep requests associated with one of devices 402A-402N. Upon receiving a sleep request, replay state machine may query the status state provided by sleep state machine. As illustrated in FIG. 8A, replay state machine may cause the power down process to be aborted if the status is BUSY, i.e., the device to be powered down is currently involved in a pending transaction. In the event of NOT_IDLE or an IDLE state, replay state machine may allow the power down process to continue and set the value of ENABLE such that CLK and DATA are overridden by O_CLK and O_DATA. Based on whether a state is a NOT_IDLE or an IDLE state, replay state machine may determine whether a STOP condition should be replayed when the device associated with the sleep request is powered up. That is, snoop and replay device 402 may replay a STOP condition to ensure that a device which entered a sleep mode during a transaction does not wake up expecting information related to the transaction, as the transaction is likely to have been completed while the device was in a sleep mode.

As illustrated in FIG. 8B, the power up process of a device may be based on whether the status is BUSY or not BUSY. For example, as illustrated in FIG. 8B if a device begins to power up during a not BUSY state (i.e., branch ending in B), a transaction will not be paused. If the power up process occurs in response to a BUSY status (i.e., branch ending in A), the transaction will be paused, until the device wakes up. When the device completes wake up, a START condition and a device address will be replayed. After the START condition and device address are replayed, a transaction may be released. Pausing and releasing a transaction are described in greater detail below with respect to FIG. 9. In either of branch A or branch B, a STOP condition may be replayed depending on the status state when the device entered a low power mode.

Figure 9:
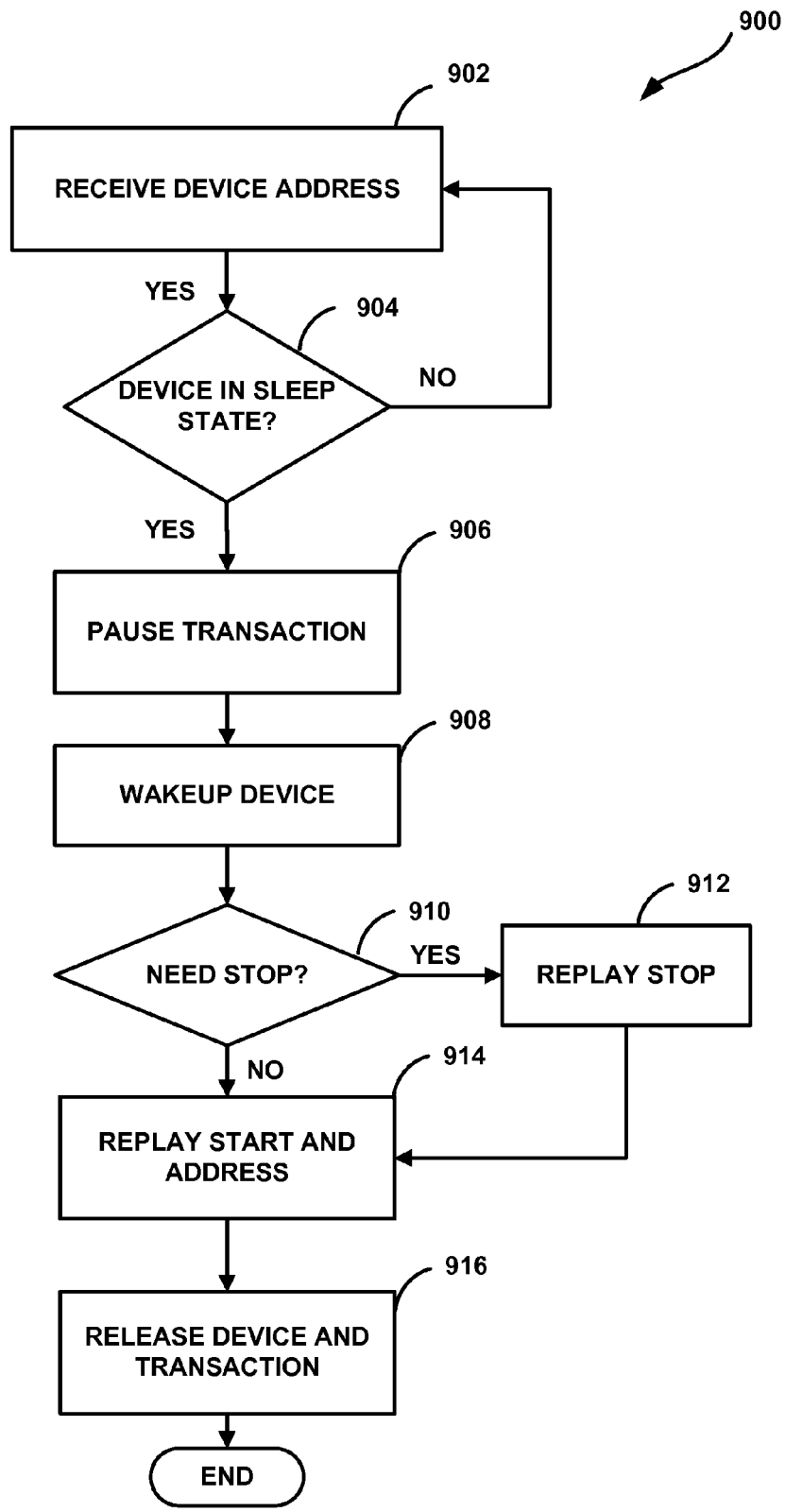
FIG. 9 is a flowchart illustrating an example method for completing a bus transaction according to the techniques of this disclosure.
Figure 10:
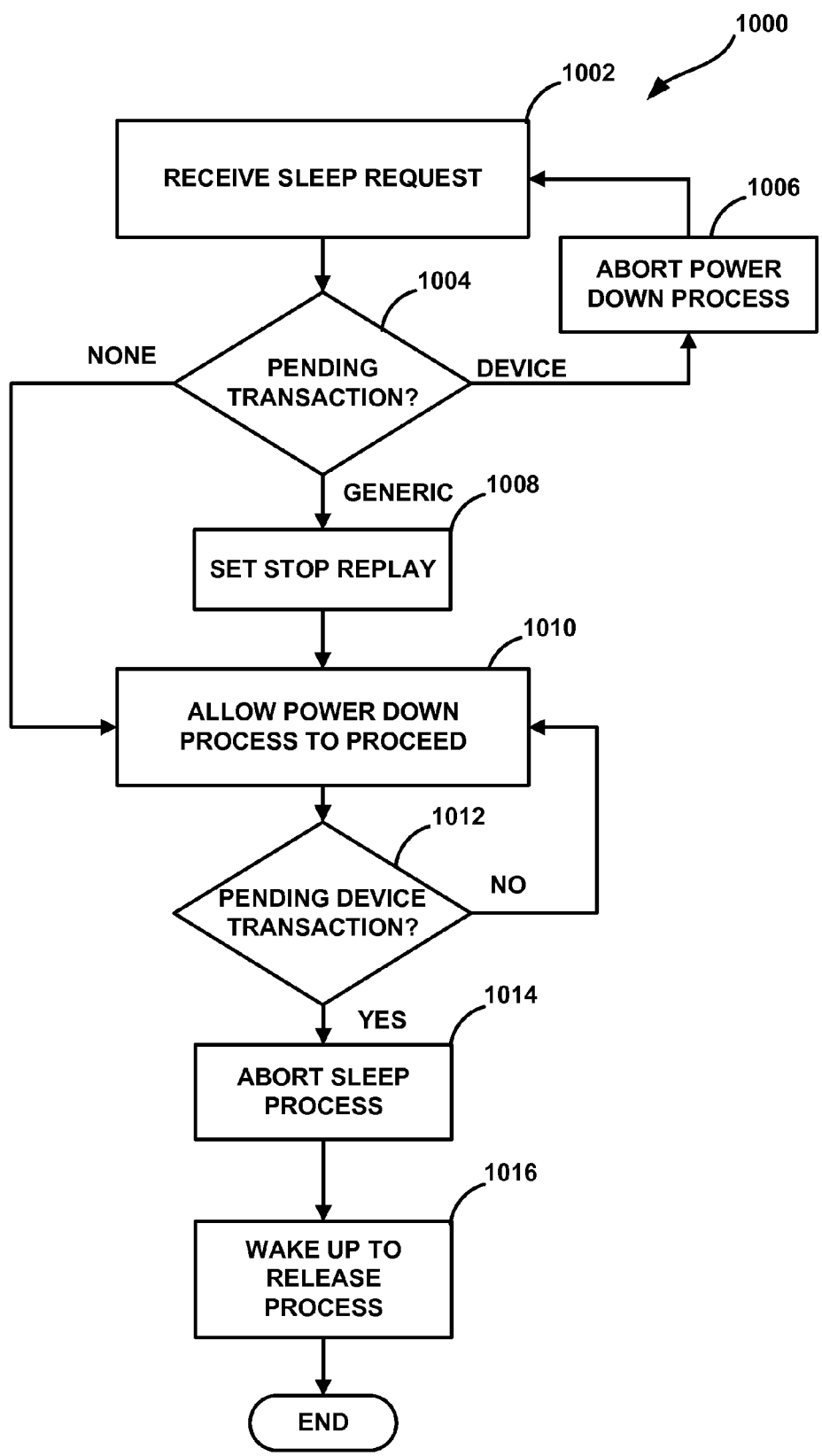
FIG. 10 is a flowchart illustrating an example method for handling power down requests according to the techniques of this disclosure.

Each of FIGS. 7-8B provide example operations of snoop and replay device 402 and based on the example operations illustrated in FIGS. 7-8B snoop and replay device 402 may be configured to perform several methods for powering up and powering down one of devices 402A-402N based on several bus communications scenarios. FIGS. 9 and 10 illustrate particular example methods that may be implemented according to the techniques of this disclosure. It should be noted, that for the sake of brevity, all possible methods based on the example operations of snoop state machine and replay state machine described with respect to FIGS. 7-8B are not described in detail, but that snoop and replay device 402 may be configured to perform any method based on the operations illustrated in FIGS. 7-8B.

FIG. 9 is a flowchart illustrating an example method for completing a bus transaction according to the techniques of this disclosure. Although method 900 is described with respect to snoop and replay device 402 and bus device 404, method 900 may be performed by any combination of components of computing device 300. Method 900 may be performed by snoop and replay device 402 to ensure the completion of transactions while minimizing latency and power consumption. Snoop and replay device 402 receives an address corresponding to one of a plurality of devices connected to a communications bus (902). The address may be transmitted by a master device subsequent to a START condition. Snoop and replay device 402 determines whether the received address corresponds to a device that is in a power state that does not enable completion of a transaction, e.g., a sleep state (904). In one example, snoop and replay device 402 may compare the received address value to a stored address value corresponding to bus device 404. Additionally, snoop and replay device 402 may compare the received address value to a stored default address. In one example, the address value may be a seven bit address value. In the case where the address value does not correspond to a device that is in a power state that does not enable completion of a transaction, snoop and replay device 402 may ignore the trans action.

In one example, the address may correspond to bus device 404 and bus device 404 may be in a sleep state. Upon determining that the address corresponds to a device that is in a power state that does not enable completion of a transaction, snoop and replay device 402 pauses the transaction associated with the received address (906). In one example, snoop and replay device 402 may pause the transaction using clock stretching described above. That is, snoop and replay device 402 may pull and hold CLK to a low value. While the transaction is paused, snoop and replay device 402 may cause bus device 404 to enter a power state that enables completion of the transaction (908). In one example, snoop and replay device 402 may be configured to wake up bus device 404. In another example, bus device 404 may be configured to wake up through internal or external logic (e.g., power management software). In this case, snoop and replay device 402 may be configured to communicate with the internal or external logic to initiate a wake up process. It should be noted that in one example, snoop and replay device 402 will not cause other devices on the bus in a sleep state to wake up if the transaction does not identify them (i.e., snoop and replay device 402 avoids false wake-ups). Further, it should be noted that from the perspective of a master device bus communications originating from snoop and replay device 402 appear to be from a slave device in a normal operating state. That is, a master device may be designed according to a bus communications protocol and may not require any specific modifications to support the operation of snoop and replay device 402.

Once bus device 404 enters a power state that enables completion of the transaction, snoop and replay device 402 may determine whether a STOP condition should be replayed (910). As described above, a STOP condition may be replayed if a device entered a sleep state during a transaction. If it is determined that a STOP condition needs to be replayed snoop and replay device 402 may replay a STOP condition (912). Snoop and replay device 402 may then replay a START condition and the device address (914). As described above, START condition, device address, and STOP condition may be replayed by setting ENABLE such that bus device 404, sees O_DATA instead of DATA and O_CLK instead of CLK. After bus device 404 receives the address, snoop and replay device 402 may release the device (e.g., disable OVERRIDE) and the transaction (916). For example, snoop and replay device 402 may release CLK and DATA and bus device 404 may send an acknowledgement to the master device initiating the transaction. As described above with respect to FIG. 2, a master device may send data to or receive data from a bus device after receiving an acknowledgement. Thus, snoop and replay device 402 and bus device 404 may be configured such that a master device operating according to I²C-bus and/or SMBUS can complete a transaction even if a transaction is initiated at a time when a slave device, such as bus device 404, is in a power state that does not allow for the completion of a transaction. In this manner, a bus device 404 may frequently enter low power states, thereby conserving power usage, without dropping bus transactions intended for bus device 404.

FIG. 10 is a flowchart illustrating an example method for managing a power down request according to the techniques of this disclosure. Although method 1000 is described with respect to snoop and replay device 402 and bus device 404, method 1000 may be performed by any combination of components of computing device 300. Snoop and replay device 402 receives sleep request (1002). In one example, a sleep request may be received from a power management system associated with a GPU and may identified one or more devices bus devices, such as, for example, bus device 404. Snoop and replay device 402 determines whether there is a pending transaction associated with the device (1004). In the case where there is a pending transaction associated with the device, snoop and replay device 402 causes the power down process to be aborted (1006). In the case whether there are no pending transactions on the bus or a pending transaction associated with another device is on the bus, snoop and replay device 402 allows the power down process to proceed (1010). In one example, snoop and replay device 402 may send a sleep request response to a power management system that indicates that it is okay to initiate a power down process. When a generic transaction is present on the bus, snoop and replay device sets a STOP replay (1008). That is, as described above, when the device wakes up a STOP condition will be replayed to prevent the device from seeing a merged transaction.

A power down process may include actions associated with placing a device in a power state where it can complete bus transactions in a power state where the device is unable to complete bus transactions. In some examples, the time it takes to complete a power down process may generally be longer than the time it takes for multiple bus transactions to be initiated. Snoop and replay device 402 monitors transactions on a communications bus. Snoop and replay device 402 may monitor transactions on a communications bus by monitoring addresses received subsequent to START conditions, as described above. Snoop and replay device 402 determines if any transactions correspond to a bus device identified in the sleep request (1012). Snoop and replay device 402 may determine if there are pending transaction by comparing received addresses to stored addresses, as described above. Upon determining that there are no pending transactions for a slave device, snoop and replay device 402 allows the sleep process to continue (1010) and continues to monitor transactions. Upon determining that there are pending transactions for a slave device, snoop and replay device 402, causes a sleep process to be aborted (1014). For example, snoop and replay device 402 may provide a sleep request response to a power management system that indicates that transactions are pending for a device. Further, snoop and replay device 402 may pause a transaction as described above with respect to 906 in FIG. 9.

Once a power down process is aborted and a transaction is paused, power management system may return a bus device to a power state that allows transactions to be completed and may perform the transaction replay process described above with respect to 908, 910, 912, 914, and 916 described above with respect to FIG. 9 (1016). For the sake of brevity, details of 908, 910, 912, 914, and 916 described above with respect to FIG. 9 are not repeated. In this manner, snoop and replay device 402 represents an example of a device configured to ensure the completion of transactions while minimizing latency and power consumption.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for completing a bus transaction, the method comprising:
    receiving an address corresponding to one of a plurality of devices operably coupled to a communications bus;
    determining whether the address corresponds to a device that is in a power state that does not enable completion of a transaction; and
    upon determining the address corresponds to a device that is in a power state that does not enable completion of a transaction,
        pausing a transaction associated with the received address;
        causing the device to enter a power state that enables completion of the bus transaction;
        transmitting the received address to the device; and
        releasing the transaction.

2. The method of claim 1, wherein pausing the transaction includes forcing a clock line of the communications bus to a state.

3. The method of claim 1, wherein causing the device to enter a power state that enables completion of the transaction includes determining whether the device entered a power state that does not enable completion of a transaction during a pending transaction.

4. The method of claim 1, wherein releasing the transaction includes allowing the clock line to go to any state.

5. The method of claim 1, wherein transmitting the address to the device includes transmitting the address through an override interface.

6. The method of claim 1, wherein the address corresponding to one of a plurality of devices corresponds to a device including a graphics processing core.

7. The method of claim 3, further comprising upon determining that the device entered a power state that does not enable completion of a transaction during a pending transaction, transmitting a stop condition prior to transmitting the received address to the device.

8. The method of claim 4, wherein the override interface includes an override data line and an override clock respectively corresponding to a data line and a clock line of the communications bus and an override enable data line.

9. A bidirectional communication system, the system comprising:
    a first device operably coupled to a communications bus and configured to operate as a slave device; and
    a second device operably coupled to the communications bus configured to:
        receive an address corresponding to the first device;
        determine that the first device is in a power state that does not enable completion of a transaction;
        pause a transaction associated with the received address;
        transmit the received address to the first device; and
        release the transaction.

10. The system of claim 9, wherein pausing the transaction includes forcing a clock line of the communications bus to a state.

11. The system of claim 9, wherein the second device is further configured to determine whether the device entered a power state that does not enable completion of a transaction during a pending transaction.

12. The system of claim 9, wherein releasing the transaction includes allowing the clock line to go to any state.

13. The system of claim 9, wherein transmitting the received address to the first device includes transmitting the address through an override interface.

14. The system of claim 9, wherein the first device includes a graphics processing core.

15. The system of claim 11, wherein the second device is further configured to transmit a stop condition prior to transmitting the received address to the device upon determining that the device entered a power state that does not enable completion of a transaction during a pending transaction.

16. The system of claim 13, wherein the override interface includes an override data line and an override clock respectively corresponding to a data line and a clock line of the communications bus and an override enable data line.

17. A device operable coupled to a bidirectional communications bus including a clock line and a data line comprising:
    one or more processors configured to:
        determine a power state of a device operable coupled to the bidirectional communications bus; and
        determine whether to replay one or more portions of a bus transaction based on the determined power state; and
    an override interface configured to provide clock and data communications independent of the clock line and data line.

18. The device of claim 17, wherein determining whether to replay one or more portions of a bus transaction based on the determined power state includes replaying one or more of a start condition, a device address, and a stop condition.

19. The device of claim 17, wherein the bidirectional communications bus is defined according to one of I²C-bus or SMBus.

20. The device of claim 17, wherein the override interface includes an override data line and an override clock respectively corresponding to a data line and a clock line of the communications bus and an override enable data line.

* * * * *